Aug. 20, 1940.　　　S. D. MITEREFF　　　2,212,426
SHOCK ABSORBER
Filed Sept. 20, 1938　　　6 Sheets—Sheet 6
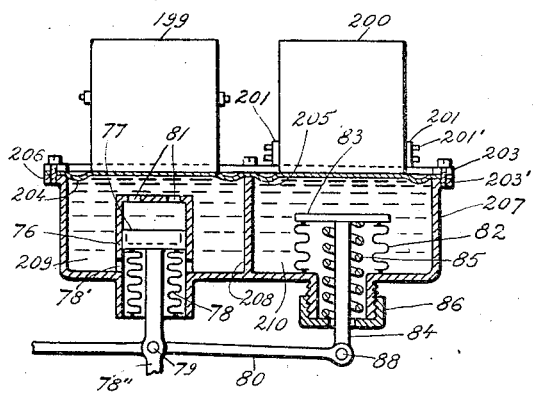
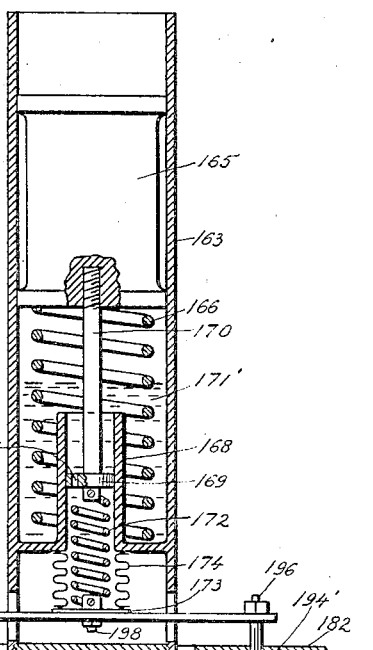
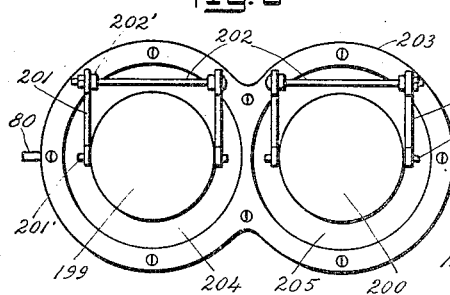
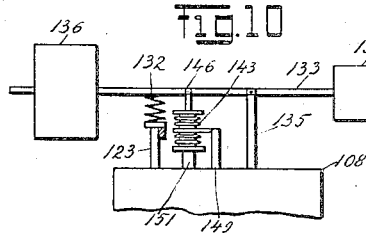
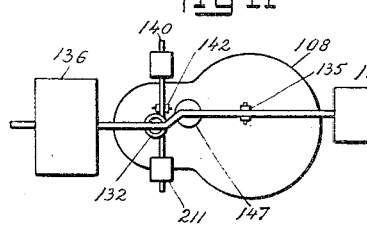
INVENTOR.
SERGEI D. MITEREFF
BY John P. Nixonow
ATTORNEY.

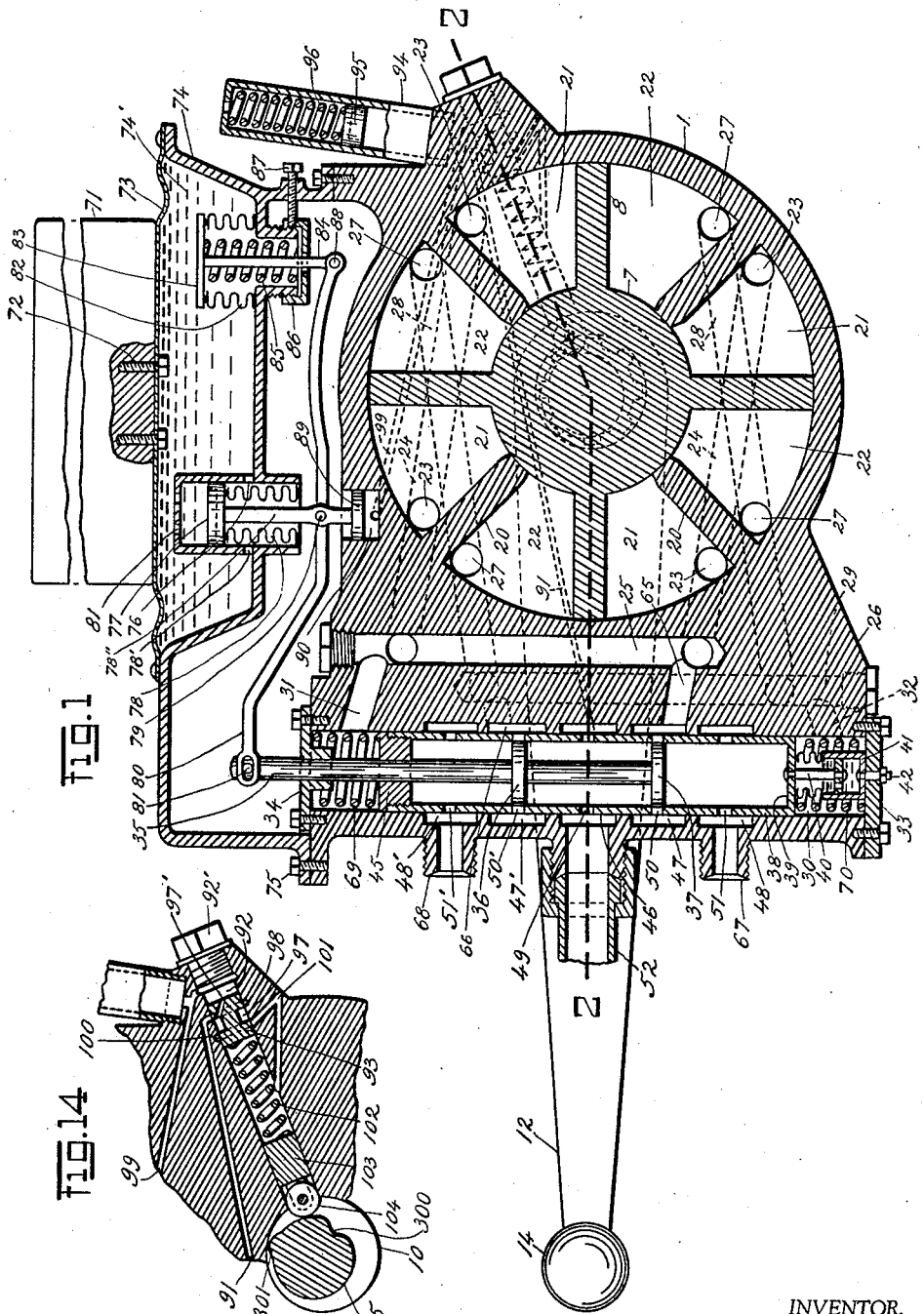

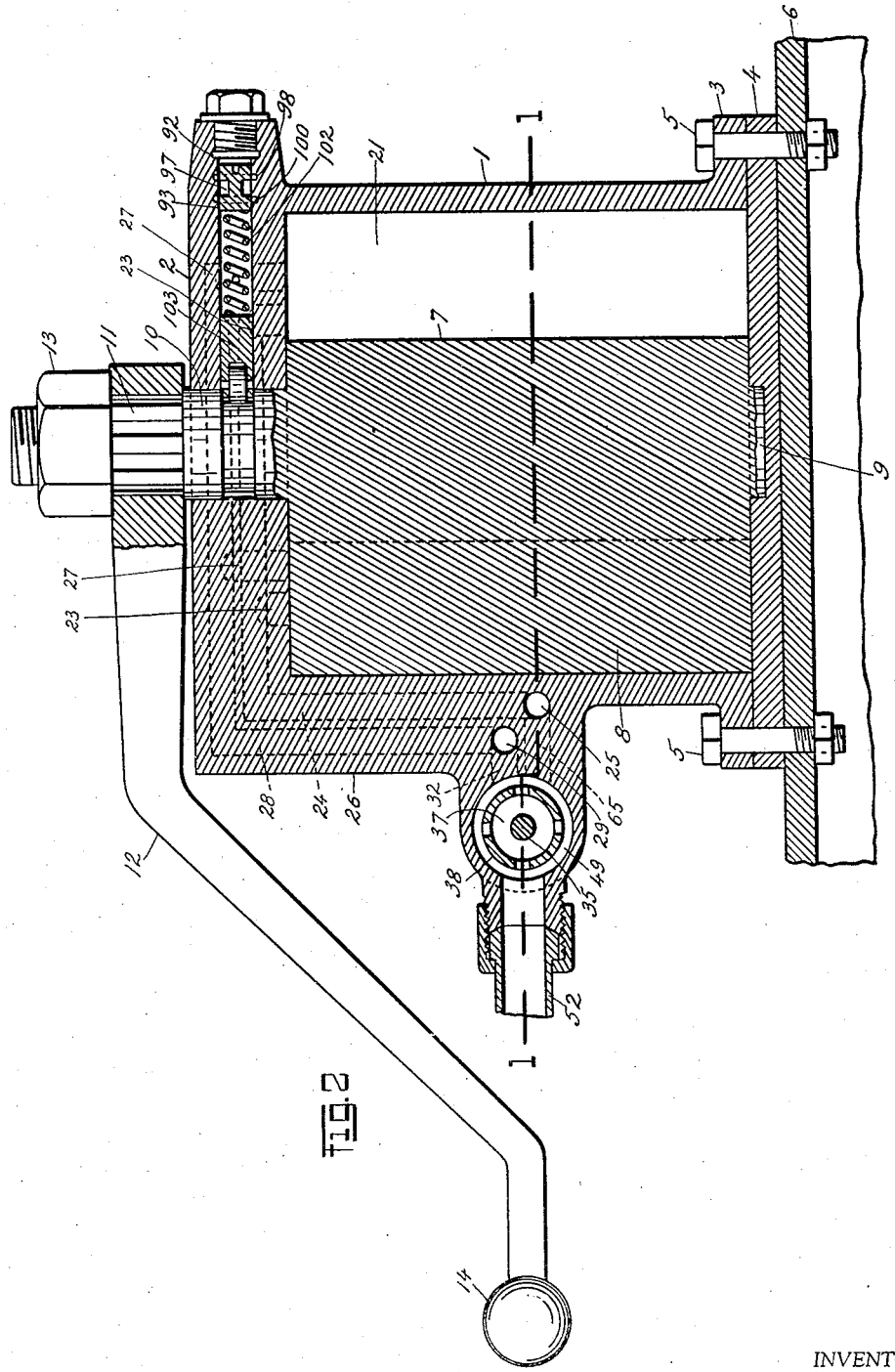

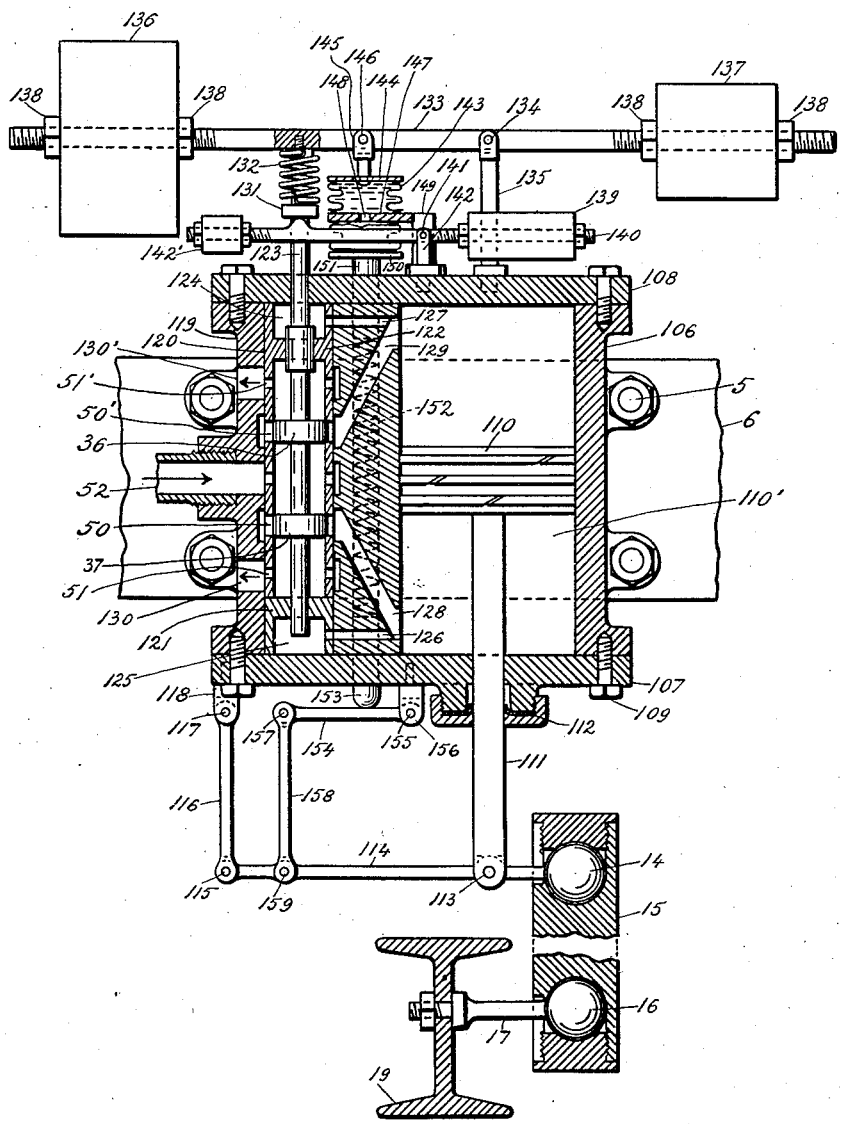

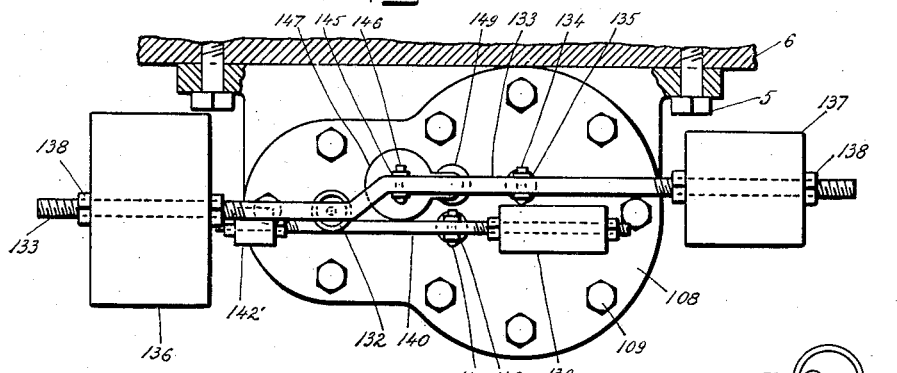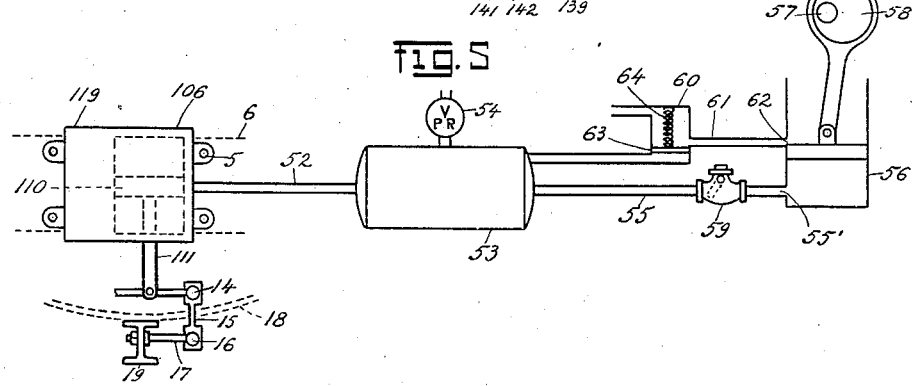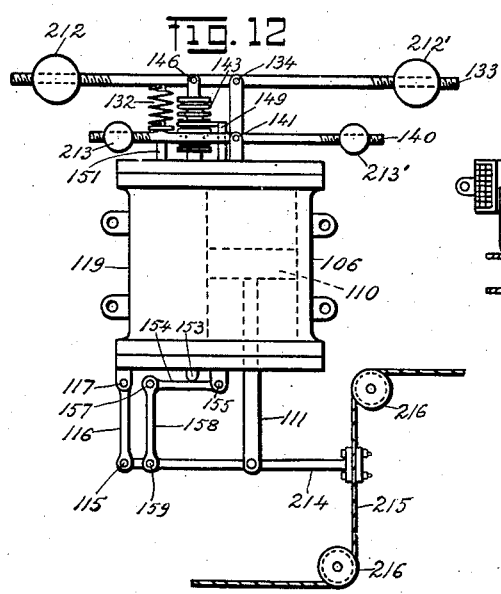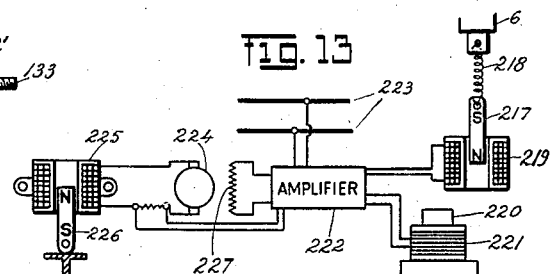

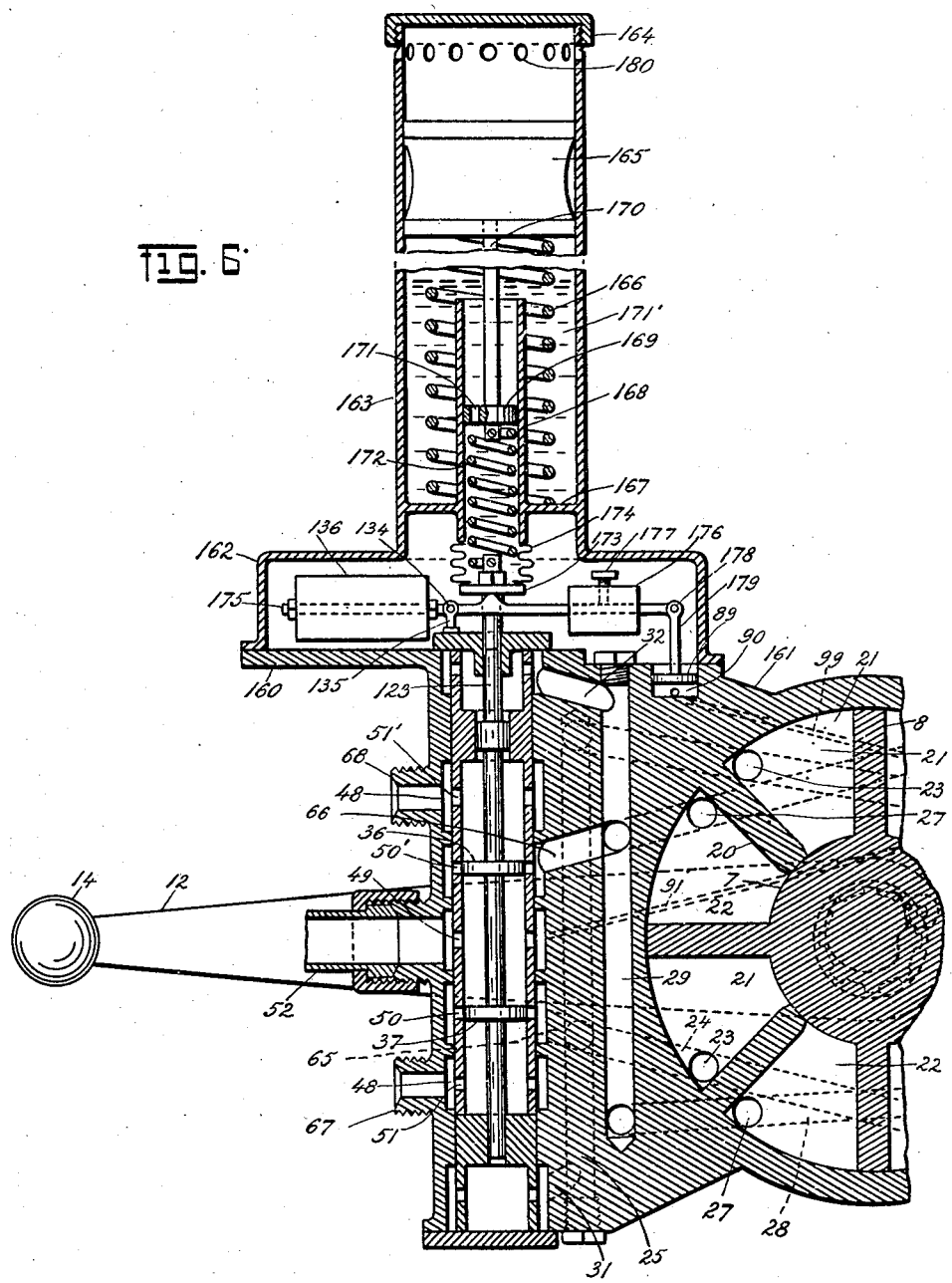

Patented Aug. 20, 1940

2,212,426

UNITED STATES PATENT OFFICE 2,212,426

SHOCK ABSORBER

Sergei D. Mitereff, Petersburg, Va., assignor of one-half to Elmon C. Gillette, New York, N. Y.

Application September 20, 1938, Serial No. 230,764

23 Claims. (Cl. 267—8)

My invention relates to shock absorbers and has particular reference to shock absorbers employing elastic or other fluid and adapted to be used with automotive vehicles, trailers, etc.

The object of ordinary shock absorbers is to reduce the recoil and oscillations of a body suspended on resilient springs and having, therefore, a natural period of oscillations. This is accomplished by absorbing the energy of compression of the spring by internal friction of a liquid which is forced to pass through restricted openings from one chamber of the shock absorber into the other, or, to a certain extent, by adiabatic compression of an elastic fluid. Such shock absorbers work on the principle of dash pots, offering but little resistance when the relative velocity of movement between the body and wheel is low, but progressively increasing the resistance at higher velocities. An ideal shock absorber will dampen the movement of the body during the first half of an oscillation thereby completely suppressing the periodicity of the body and spring oscillations. In practice, however, such a rapid energy absorption will render the suspension very stiff with the resulting very rough movements of the body when traveling over rough roads. Some relief may be obtained by providing means to regulate the rate of flow of the dampening liquid as, for instance, by having several by-passes of different sizes which become successively operative at different relative positions of the axles and the body of the vehicle, or by controlling the pressure of the dampening liquid and even replacing it by a compressible fluid. Attempts have been also made to control the resistance to the flow of the liquid by inertia force of pilot weights attached to the body.

None of these arrangements of shock absorbers have been found fully satisfactory. The main difficulty in bringing periodic oscillations of a body under control and dampening them resides in the fact that the suspension springs are not supported on a fixed foundation but move up and down as the wheels roll over uneven places on the ground. In order to obtain aperiodic oscillations under such conditions, the resistance to the flow of liquid in an ordinary shock absorber must be increased to such an extent that the body would be compelled to follow closely the movements of the wheels in a series of irregular jolts in riding over rough spots. For this reason it has been found impractical to try to obtain aperiodic dampening of oscillations and the shock absorbers are usually regulated so as to dampen oscillations more or less gradually. The result is that the riding comfort is reduced because neither the first jolt transmitted to the body every time the wheels strike an impediment on the road is decreased nor ensuing oscillations are dampened aperiodically.

It may be noted that ordinary leaf springs produce a certain dampening effect as a result of friction between the leaves, but this effect is unsatisfactory because of the abrupt reversal of direction of such friction. Helical springs are more satisfactory in this respect.

Ordinary shock absorbers do not solve the problem of proper stabilization of a moving vehicle, also for the reason that they apply dampening effect equally and simultaneously to the body and to the axles, although the requirements of these elements are quite different, not only with respect to the magnitude and direction of dampening forces, but also to the time of their application.

It is evident that the greatest degree of stabilization is wanted for the body, and with an ideal stabilization or with an ideal shock absorber the body will remain practically at the same level in relation to the surface of the road in general; while the wheels with the axle must be quite free to move up and down, following minor irregularities of the road, so that even at higher speeds of the vehicle the body will float smoothly in an approximately parallel alignment with the road while the wheels will move up and down over the irregularities of the road surface. In order to approach such an ideal condition, a dampening force must be applied to the body in phase with and proportional to its absolute vertical velocity. It is also desirable to apply a second force which will be proportional to the vertical acceleration of the body in space. This second force, if applied in one direction, will have the effect of diminishing the natural force of inertia of the body so that it will be possible to use a smaller dampening force for obtaining aperiodic stabilization.

If this second force is applied in the opposite direction it will have the effect of increasing the natural inertia reaction of the body, thus considerably lengthening the natural period of oscillation of the body and decreasing its acceleration. The choice of the direction of application of this corrective force is largely optional. As a general rule, with light cars it may be desirable to increase the inertia while large and heavy cars, busses etc. may require its decrease.

In practice the two forces can be combined together so as to obtain one effective force proportional to their algebraic sum applying this force to the body and using the wheel axle as a reactive support, for this force.

The problem resolves therefore to the creation of a force applied between the wheel axle and the body and proportional at any given moment to the vertical velocity, plus or minus vertical acceleration of the body. Mathematically the applied stabilizing force may be expressed by the following equation:

$$F = K_1 \frac{dP}{dT} + K_2 \frac{d^2P}{dT^2}$$

where F is the stabilizing force, P—vertical displacement of the body, T—time, and $K_1$, $K_1$ are arbitrary constants of adjustment.

It should be noted that while in ordinary shock absorbers the stabilizing force is substantially proportional to the velocity of relative displacement between the body and the axle, in my stabilizing device a force is applied to the body, which is proportional to the absolute velocity and absolute acceleration of the body in space. It is evident that this is a fundamental distinction which permits not only of a perfectly aperiodic dampening of the movements of the body but it even tends to completely eliminate the original response of the body to road shocks.

It should be pointed out that an ordinary shock absorber, even when adjusted for very light dampening effect, must necessarily increase the vertical acceleration of the body when the wheels strike an obstruction and compress the springs. This is because the direction of stabilizing force and change in spring tension are coincident until the body starts overtravel or moves away from the wheel as a further result of the original impact.

With my stabilizing device the suspension springs can be made longer or shorter without materially affecting the riding comfort, the only requirement being that the springs should have sufficient travel to clear ordinary rough spots on the road. In fact, with certain adjustments my device can completely eliminate the springs.

In a typical practical embodiment of my invention I employ a combination of a piston and cylinder interposed between the body and the springs or ends of the front and rear axles, the cylinder having an upper and lower compartment at the corresponding sides of the piston. It should be noted that these compartments for convenience will be called "upper" and "lower" corresponding to their positions in a vertical cylinder, although the cylinder with suitable operative connections, may be placed in an angular and even horizontal position or any other suitable fluid operative motor may be used instead of the piston and cylinder. I also provide means to vary the difference in the fluid pressure in the upper and lower compartments in proportion to the vertical velocity and acceleration of the body. For this purpose I provide a source of compressed fluid, preferably air, and control its admittance to the cylinder by a suitable valve actuated by a mechanism responsive to the vertical velocity and acceleration of the body. In order to obtain proportional regulation of the valve and to restore it into its neutral position, a valve operating mechanism is provided responsive to the difference in pressure between the two sides of the piston or between the two portions of the cylinder. It should be noted that in my mechanism this difference in pressure does not primarily depend on the relative velocity of displacement of the body and the axle or, in other words, it does not depend on the travel of the piston in relation to the cylinder; there is, however, provided a relatively small adjustment responsive to the relative displacement of the body and axle in order to correct inaccuracies of the main controlling mechanism which may appear in time.

I also provide means to prevent the body from tilting over or rocking when the vehicle is rounding a curve at a more or less high speed. For this purpose I provide hinged weights which exert pressure on the valve operating mechanism not only under action of vertical forces of inertia but also under horizontally acting centrifugal force, the hinges being positioned so as to cause the valve on the outer side of the body to build up pressure above the piston for resisting downward movement of the body while the valve on the other side of the body will admit the compressed air to the opposite side of the corresponding piston for keeping the body down.

In a modified form my shock absorber can be used for stabilizing an aircraft in flight. It should be noted that an airplane in flight can be considered suspended in an elastic or even resilient medium, similarly in certain respects to the spring suspension of an automobile. For this purpose I provide my device with inertia elements responsive to angular indications but not responsive to vertical forces. Any angular displacement of a vehicle, therefore, will cause the valve to move, thereby admitting compressed air into the cylinder and causing the piston to move. This movement will be transmitted to the ailerons on the wings in a proper direction so as to restore the horizontal position of the airplane. The pressure of air stream on the ailerons will be balanced by the pressure on the piston, the valve being restored into the neutral position by the differential pressure on the side of the piston.

It is obvious that my invention may be embodied in more or less different forms as it will be apparent in the accompanying specification in which certain typical embodiments are described and illustrated, in the drawings as follows:

Fig. 1 is a sectional elevational view of my shock absorber and stabilizer taken at the line 1—1 of Fig. 2.

Fig. 2 is a sectional view of the same taken on the line 2—2 of Fig. 1.

Fig. 3 is a sectional elevational view of a modified shock absorber.

Fig. 4 is a top plan view of the shock absorber shown in Fig. 3.

Fig. 5 is a diagrammatic view of my shock absorber with a source of compressed fluid for its operation.

Fig. 6 is a fractional sectional elevational view of a modified shock absorber.

Fig. 7 is a sectional elevational view of another modification.

Fig. 8 is a detail view of a modified inertia responsive part of my shock absorber.

Fig. 9 is a top plan view of the same.

Fig. 10 is a detail view of another modification of the inertia responsive part.

Fig. 11 is a top plan view of the same.

Fig. 12 is an elevational view of a modified stabilizer as applied to the operation of airplane ailerons.

Fig. 13 is a diagrammatic view of an electromagnetic shock absorber.

Fig. 14 is a fractional detail view of an air valve forming a part of the apparatus shown in Fig. 1.

Fig. 15 is an end view of a detail shown also in Figs. 10 and 11.

One embodiment of my invention is shown in Figs. 1, 2 and 14 and consists of a hollow cylindrical casing 1 with a closed outer end 2 and an open inner end with a flange 3 to which a flat cover 4 is attached by bolts 5.

These bolts are also used for attaching the casing 1 to a frame 6 of a vehicle such as an automobile, etc. An impeller having a hub 7 and vanes 8 is rotatively fitted in the casing 1 for which purpose it has trunnions 9 and 10 journaled in the cover 4 and end portion 2 respectively. The trunnion 10 has a splined extension 11 fitted in a splined hole in an arm 12 tightened on the extension 11 by a nut 13. The end of the arm 12 has a ball 14 rotatively clamped in the end of a tubular link 15 (Fig. 3). The other end of the link 15 engages a ball 16 on the end of a rod 17 extending from an axle 19 of the vehicle, preferably suspended from the frame 6 on suitable springs 18 shown diagrammatically in Fig. 5. The arm 12 therefore moves with the axle 19 when the springs 18 are flexed one way or the other when the vehicle moves over a more or less rough road, the relative movement between the axle and the frame resulting in the rotation of the impeller in the casing. The blades 8 have an air tight fit in the casing 1 and may be provided with a suitable packing (not shown). The casing 1 has inwardly extending stationary vanes 20 interposed between the impeller vanes 8. The stationary vanes also form an air-tight sliding fit in the casing 1 thereby forming air-tight chambers 21 and 22. The impeller, with the casing therefore forms a compressor for a fluid such as air which may be placed in the chambers 21 and 22. The device can also operate as a motor when a fluid is delivered under pressure into the chambers 21, for instance, while exhausting the fluid from the opposite chamber 22. Chambers 21 have ports 23 in communication with each other through ducts or holes 24 and 25 bored in the end wall of the casing 1, and in an enlarged portion 26 of the casing 1. Similarly the chambers 22 have ports 27 in communication with each other through ducts or holes 28 and 29. The holes 25 and 29 are in communication with a cylindrical valve chamber 30 through ducts 31 and 32.

The valve chamber 30 is closed at the bottom and at the top by covers 33 and 34. The latter cover has a hole for a rod 35 having valve discs 36 and 37. These discs form an inner valve sliding in an outer tubular valve 38 which in turn slides in the valve chamber 30. The lower end of the tubular valve 38 has a bottom plate 39 to which a plunger 40 of a dash pot 41 is attached the latter being fastened by a bolt or screw 42 to the cover 33. The dash pot attachment tends to retard the movement of the tubular valve 38, the dash pot being filled with oil. Springs 70 and 69 press against the bottom plates 39 and 45 yieldably retaining the valve in the central position. The valve chamber 30 has annular grooves or recesses 46, 47, 47', 48 and 48' in communication with the inside space of the sleeve valve 38 through ports 49, 50, 50', 51 and 51'. The groove 46 opens into a pipe 52 extending from a tank 53 (Fig. 5) with a safety valve 54 for a compressed air or similar fluid. The tank 53 is connected by a pipe 55 with an exhaust port 55' of an air compressor 56, with a piston connected to a shaft 57 through an eccentric 58. The shaft 57 may be operated by an engine or auxiliary motor (not shown). A check valve 59 is placed in the pipe 55 and prevents the reverse air flow from the tank.

In order to relieve the compressor when there is sufficient pressure in the tank 53, an unloading valve 60 is provided in a pipe 61 to the intake port 62 of the compressor 56. A plunger 63 keeps the valve 60 open under pressure of a spring 64. When the pressure in the tank rises, however, to a certain point, the plunger 63 is moved upward against the tension of the spring, closing the intake for the compressor and thereby unloading the latter.

The groove 47 is connected by a duct 65 with the duct 25, the groove 47' being connected with the duct 29 by a duct 66. The ducts 48 and 48' are opened to the outside air through nipples 67 and 68 which may be threaded as shown for connection with an air filter or similar device (not shown), or else with a vacuum tank, if vacuum operation is preferred.

The valve discs 36 and 37 normally keep the ports 50' and 50 closed, the sleeve valve 38 being kept in the neutral or middle position by springs 69 and 70. The sleeve valve remains in the neutral position as long as the air pressure on both ends remains the same. A slight difference in the exposed end surface can be taken care of by adjusting the lower spring 70 for less compression than the upper spring 69. One of the objects of this arrangement is to relieve any pressure which may be built up in the compartments 21 or 22 when the arm 12 is moved up or down in relation to the casing 1. Thus, for instance, if the arm 12 is moved upward, air in the compartments 22 will be compressed with the creation of corresponding vacuum in the compartments 21. As a result, there will be differential pressure on the ends of the sleeve valve 38, causing the latter to move upward against the pressure of the spring 69. The port 50 will be then uncovered into the inner chamber of the sleeve valve in communication with the port 49, thereby admitting compressed air into the compartments 21 and compensation vacuum created therein. The port 50' will be at the same time moved away from the disc 36 and uncovered being brought into communication with the port 51' and allowing therefore the air from the chambers 22 to escape into the atmosphere. The pressure in the chambers 21 and 22 will be thus equalized and the sleeve valve brought back into the neutral position. Similar equalization will take place when the arm 12 is moved downward so that there will be no resistance for the movement of the arm 12 as long as the valve discs 36 and 37 remain stationary.

The object of the disc valve assembly 36 and 37 is to control admission of the compressed air into the compartments 21 and 22 so as to stabilize the movements of the body of the vehicle. For this purpose the valve stem 35 is connected with inertia responsive mechanism. The latter comprises a relatively heavy block or weight 71 attached as by screws 72 to a flexible diaphragm 73 attached at its edges to the rim of a well 74 fitted on top of the casing 1 and attached with screws 75. The well is filled with a suitable relatively incompressible liquid 74' such as colloidal mixture of oil and sulphur, mixture of glycerine and alcohol, etc. It has a cylinder 76 fitted in its bottom portion with a plunger 77 having flexible bellows 78 attached to the lower end of the cylinder and forming an annular chamber, the liquid in communication with the well 74 through vents 78'. A rod 78" extends from the plunger and has a pivot 79 connection with a lever 80. The top of the cylinder is closed with a cover having apertures 81 for admitting the liquid in and out of the cylinder, thereby causing the plunger to move up and down.

A second cylinder is provided in the well having flexible or collapsible walls 82 and a top plate 83, the latter serving as a plunger, a rod 84 extends from the plate 83. A compression spring 85 keeps the plunger plate 83 in the raised position. The tension can be adjusted by a cap 86 threaded on the end of the cylinder. The cap is retained in its adjusted position by locking a set screw 87 fitted in the wall of the well. The other end of the rod 84 is pivoted at 88 to one end of the lever 80. One or the other of the pivots 79 and 88 form, therefore, a fulcrum for the lever 80 depending on which plunger is moved. The other end of the lever 80 is connected to the end of the valve rod 35 as by a pin 81 engaging elongated slots in the formed end of the lever 80.

The operation of my shock absorber is as follows:

As long as the vehicle equipped with my shock absorbers travels on a smooth surface, the weight of the body will be balanced by the resistance of the springs over the wheels. Oil 74' or other suitable liquid in the well 74 will be under normal pressure from the weight 71, the valve discs 36 and 37 and the sleeve 38 being then in the neutral position with both ports 50 and 50' closed. The air pressure will be equal at both sides of the piston vanes 8 or in chambers 21 and 22. If the vehicle, or one of its wheels, will encounter a raised spot, stone, etc., on the road, the wheel will rise in passing over the obstacle, compressing the spring before the inertia of the body is overcome. The arm 12 will be turned by the rising axle causing movement of the piston vanes 8. As a result; air in the chambers 22 will be compressed and correspondingly expanded in the chambers 21. As soon as an appreciable difference in pressure is built up, however, the sleeve valve 38 will be moved upward, as it was explained before, its lower end being in communication with the now compressed air in the chambers 22 through ducts 32, 29 and 28, the upper end being in communication with the exhaust side 21 of the piston vanes, ducts 31, 25 and 24. The sleeve valve will open the port 50 admitting compressed fluid from the pipe 52 into the chamber 21 and the port 50' will also be opened permitting escape of the air from the chamber 22. The port will remain open until the air pressure at both sides of the piston is substantially equalized, when the sleeve valve will return to its neutral position under action of the equalizing springs 69 and 70. This operation will be repeated with the further movement of the arm 12 with the result that the arm 12 will move freely without practically any resistance from the piston vanes 8.

Such an effect can take place, however, only in the absence of inertia forces, i. e., when the car travels slowly or when the rough spots on the road are relatively slight, resulting in a very soft ride with practically no resistance added to the action of the vehicle suspension springs.

If the prominence on the road is such, however, that the spring supporting the body above the wheel is appreciably compressed, the increased spring tension will tend to lift the body with the upward acceleration. This will cause the weight 71 to exert pressure on the oil 74' in the reservoir 74. The total travel of the weight being small, its pressure will be proportional to the acceleration of the body due to the downward inertia reactive force of the weight. Pressure will be transmitted through the oil to the pistons 77 and 83. Its effect on these pistons will be different, however, since the movement of the piston 83 is resisted by the compression spring 85, while the movement of the piston 77 is retarded because the oil must pass to the piston through the apertures 81. The travel of the piston 77 will be, therefore, in delayed phase relation to the travel of the piston 83 so that the latter will have a tendency to move first thereby slightly raising the valve rod 35 while the piston 77 has not yet moved. This effect, however, will be of relatively short duration since the apertures 81 are relatively large and the spring 85 is relatively strong, so that the valve 35 will begin almost immediately to move downward under the predominant action of the piston 77 which is responsive to the upward velocity of the body.

The valve rod 35 when moving downward, opens the port 50 thereby admitting compressed air from the pipe 52 into the chamber 21 through the ducts 65', 25 and 24 and ports 23. The port 50' will be also opened connecting the chambers 22 with the outside air through the ports 27 and ducts 28, 29 and 66. The difference in pressure thus established between the chambers 21 and 22 will be communicated to the opposite ends of the sleeve valve 38, causing the latter to follow the valve 35 and to move downward to a distance equal to the displacement of the valve 35 thereby closing the ports 50 and 50'. If there is any leakage of air between the chambers, it will cause the sleeve 38 to move slightly upward thereby reestablishing the difference in pressure. Since the sleeve 38 is centered on the springs 69 and 70 the air pressure necessary to move it in accordance with the movement of the valve 35 will increase with the compression of the springs and will be proportional to the downward travel of the valve 35, which is proportional to the upward velocity of the body less its acceleration. The upward (clockwise on the drawings) torque of the air pressure on the piston vane 8 is also proportional to velocity of the body minus acceleration. This torque is transmitted to the axle 19 by the arm 12 in the upward direction and, therefore, to the body in the downward direction, thereby restraining the latter from following the axle and from moving upward. It should be noted that in my system the valves reverse the air pressure which normally should be developed in chambers 21 and 22 under action of moving vanes 8.

The upward movement of the axle will cease when the wheel reaches the top of the elevated spot on the rod. If the elevation continues for some distance, the body will gradually adjust itself to the new position in space above the axle, i. e. it will reestablish the normal elevation above the axle, such a movement will take place without overtraveling and, therefore, aperiodically, without subsequent oscillations. This is due to the fact that the valve 35 will remain in downward position from the neutral as long as the body has a tendency to move upward and therefore the differential air pressure on the vanes 8 will restrain the body from moving upward, the releasing action taking place gradually and without overtravel on the part of the body.

If the wheels move downward, the body will have a tendency to follow them in the downward direction, thereby causing the weight 71 to exert inertia reactive force in the upward direction, reducing the oil pressure in the well 74 and causing the pistons 83 and 77 to move upward. The valve 35 will move upward, admitting compressed air into the upper chambers 22 and restraining thereby the downward movement of the body. The operation in all other respects will be similar to the already described operation when the wheels move upward.

The plunger rod 78'' has a substantially constant loading pot consisting of a plunger 89 moving in a pot or cylinder 90. The latter is connected by a duct 99 with a chamber 92 in which slides a cylindrical valve 93. A shock absorbing element is also connected with the chamber 90 consisting of a cylinder 94 with a plunger 95 resting against a compression spring 96. The plunger acts as a buffer, moving inwardly when there is a sudden rise in pressure in the chamber 90. The valve 93 has an annular recess 97 (see also Fig. 14) in communication with the chamber 92 by means of a short duct 97'. The front end portion of the valve covers an annular groove 98 connected with the pipe 52 by a duct 91. The rear valve portion closes an annular groove 100 connected with the outside air through a duct 101. A helical compression spring 102 keeps the valve in its neutral position as shown, the spring resting against a sliding block 103 with a roller 104 resting against an eccentric 105 on the shaft 10. The eccentric is positioned so that it rests with its middle portion against the roller when the arm 12 is in the middle or neutral position. The eccentric moves the block from center of shaft 10 when the arm 12 is raised and lets the block slide back when the arm 12 is lowered. At the extreme limits of movement of cam 105 it is provided with raised portion 301 and a depression 300 in order to prevent excessive travel of the wheels when encountering unusually bad road conditions.

In the first case the spring moves the valve out until the groove 98 is uncovered, admitting compressed air from the pipe 52 into the chamber 92 and through the duct 99 with the cylinder 90. This retards any further movement of the plunger 77 without affecting the plunger 83. As a result, the movement of the valve 35 will be reversed. The movement of the valve 93 will be stopped and the valve moved back into the neutral position when the pressure in the chamber 92 compensates the pressure of the spring 102. It is evident that greater air pressure will be maintained in the cylinder 90 for greater upward deflections of the arm 12. The reverse takes place when the arm 12 is moved downward, the valve 93 moving then inward and opening the groove 100 into the atmosphere and thereby reducing pressure in the pot cylinder 90. In this way a constant average distance is maintained between wheels and body. The desired degree of averaging delay between pressures in duct 92 and duct 99 being controlled by plug 92' partially closing duct 99.

A modified device is shown in Figs. 3 and 4. A cylindrical casing 106 is attached to the frame 6 of the vehicle by bolts 5 and has covers 107 and 108 attached to the casing by bolts 109. A piston or plunger 110 slides in the bore 110' of the cylinder and has a rod 111 sliding in an air-tight gland 112. The other end of the rod 111 is pivoted at 113 to a bar 114 having a ball 14 at the end engaged by a ball-shaped bearing in a tubular rod 15 mounted on the axle 19 of the vehicle.

The other end of the bar 114 is pivoted at 115 to a supporting link 116 pivotally connected at 117 to a lug 118 on the cover 107. The casing 106 has an extension 119 with a cylindrical bore for a stationary sleeve 120. The latter has end walls 121 and 122 with bearings for the stem of a sliding valve 123. Air chambers 124 and 125 are formed at the ends of the sleeve 120 and are connected with the cylinder bore 110' by ducts 127 and 126. The stem of the valve 123 is of an enlarged diameter at the top where the stem passes through the end 122 in order to equalize the air pressure on both ends of the stem.

This is accomplished by making the area of the shoulder at the enlarged upper portion of the stem equal to the area of the lower end portion. The valve has valve discs 36 and 37 closing ports 50' and 50 when in the neutral position. These ports are in communication with ducts 129 and 128 extending to the upper and lower ends of the cylinder bore 110'. The ducts terminate at a distance from the end covers 107 and 108 in order to provide a dead space for the air at the end of the piston travel so as to form a shock absorbing buffer between the piston and the end covers. Exhaust ports 51 and 51' are also provided in the sleeve 120 in communication with the exhaust ports 130 and 130'.

The upper end of the valve stem 123 has an enlarged portion 131 to which one end of a spring 132 is attached. The other end of the spring is attached to a lever 133. The spring thereby serves as a connecting link between the valve stem 123 and the lever 133, working both on compression and tension. The lever 133 is pivoted at 134 on a standard 135 mounted on the cover 108. Blocks or weights 136 and 137 are slidably mounted on the ends of the lever 133. The weight 136 is made larger and heavier than the weight 137 and their relative positions can be adjusted by nuts 138 threaded on the ends of their lever 133.

The valve 123 may be displaced from the neutral position by a differential pressure in the end chambers 124 and 125 which may be caused by the displacement of the piston 110 in the bore 110'. It can be seen that such a displacement of the valve will result in the equalization of the air pressure at the opposite sides of the piston, the effect being similar to equalizing action of the sleeve 38 in Fig. 1.

Thus if the piston 110 is moved upward, for instance, compressing air in the upper portion of the cylinder, the increased air pressure will cause the valve 123 to move downward. The disc 37 will uncover the port 50, admitting compressed air into the lower portion of the cylinder, while the disc 36 will uncover the port 50', releasing air from the upper cylinder portion into the atmosphere. As a result, the pressure on both sides of piston 110 will be equalized.

The differential weight of the blocks 136 and 137 acting on the stem 123 through the spring 132, corresponds to the velocity component of the weight 71 in Fig. 1. The inertia component is represented by a weight 139 adjustably mounted on the threaded end of a lever 140 pivoted at 141 on a bracket 142 supported on the cover 108. A small regulating weight 142' is adjustably fitted on the other end of the lever. The lever 140 engages the enlarged portion 131, tending to lift the stem 123 under action of the larger weight 139.

The necessary retarded action for the velocity component is obtained by connecting an oil dash pot to the lever 133. The dash pot is represented by a flexible cylinder 143 with an upper cover 144 having a clevis 145 pivoted at 146 to the lever 133. A middle wall 147 is fitted in the cylinder and is provided with a small aperture 148 for allowing oil, or similar liquid, to pass between the lower and upper compartment of the cylinder 143.

The wall or diaphragm 147 extends outside the cylinder and is mounted on a bracket 149 supported on the top cover 108 of the casing 106. The lower cover 150 of the cylinder 143 rests on the end of a rod 151 slidably fitted in a corresponding hole in the casing extension 119. The lower end of the rod 151 engages the upper end of a spring 152 whose other end presses against a second rod 153 extending outside the casing and resting against an arm 154. The latter is pivotally supported at 155 in a bracket 156 extending from the lower cover 107 of the casing, the other end being pivotally connected at 157 to one end of a link 158 whose other end is pivoted at 159 to the lever 114. This arrangement is equivalent to the eccentric regulated dash pot 89, 90 of Fig. 1. An upward movement for instance, of the frame 6 or body of the vehicle, will result in the downward movement of the weight 136, forcing the oil from the upper portion of the cylinder 143 through the aperture 148 into the lower portion against the pressure of the spring 152. The resistance of the spring will be increased as the piston 110 moves upward and will correspondingly decrease for its downward movement.

A modified device is shown in Fig. 6. The main portion of the apparatus is similar to the one shown in Fig. 1 with the exception that a shelf 160 is provided on top of the casing 161 for the enlarged base 162 of a relatively tall tube 163 with a cap 164 on top. A weight 165 slides in the tube and is supported on the end of a long compression spring 166 whose other end rests on a partition 167 at the lower end of the tube. The partition supports an inner tube 168 serving as a dash pot in connection with a plunger 169 mounted on the ends of a rod 170 extending from the weight block 165. An aperture 171 allows the oil 171' to flow from one side of the plunger to the other.

A spring 172 is fitted in the lower portion of the cylinder 168 and is attached at its upper end to the plunger 169, the lower end being attached to the upper end of the valve stem 123. A disc 173 is also attached to the end of the stem 123 and forms a bottom plate of a flexible cylinder 174 forming a continuation of the cylinder 168. A lever 175 is pivoted at 134 in a bracket 135 and carries an adjustable fitted weight 136, the other end of the lever carrying a smaller weight 176 adjustable fixed by a set screw 177. The middle portion of the lever 175 rests against the under side of the disc 173, the end of the lever being pivotally connected at 178 to a rod 179 having a plunger 89 at the end.

With this device in operation, when the vehicle reaches an elevated spot on the road, the body suspension springs will begin to be compressed. The first tendency of the body to go down will be overcome by the compression of the springs with the result that the body will have a tendency to move upward. The weight 165, being supported by a long spring 166 of an almost constant resistance, will have a tendency to remain stationary in space by inertia. The casing 161 will move upward, compressing the spring 166 and causing the piston 169 to move in the dash-pot 168, forcing the liquid in the dash pot to move upward through the orifice 171. The oil pressure in the dash pot may be made very small in comparison to the force of inertia of the weight 165 and therefore, the resistance of the dash pot will have only a very small effect on the weight 165 except that it will inhibit its oscillations.

The oil pressure under the piston created by the upward movement of the body will be proportional in magnitude to the rate of relative displacement between the weight 165 and the casing 161 and will be, therefore, proportional to the absolute velocity of the body in space.

A relatively weak tension-compression spring 172 under the piston 169 will produce a downward force on the bottom of the dash pot which force will be proportional to the absolute vertical displacement of the body. The weight 136 will move with the body and will generate downward reaction force proportional to the absolute acceleration of the body in space. This force is transmitted to the bottom of the dash pot as in upward thrust because the support is located between the weight and the dash pot.

It will be seen, therefore, that the bottom 173 of the dash pot which is attached to the valve 123 will be subjected to three forces: one, proportional to the vertical displacement of the car, another proportional to the velocity of displacement of the body, and third, proportional to the acceleration of the body.

The mechanism may be made and adjusted so that the first two forces will be greater than the third so that the net force acting on the vlave 123 will be in downward direction, so that the valve 123 will move downward to a small distance thereby admitting compressed air into the chambers 21, releasing air from the chambers 22.

The torque thus created and applied to the piston vanes 8 will be transmitted by the arm 12 as an upward force to the axle and as a downward force to the body. In view of the fact that the valve 123 in the form of pistons subjected to the difference in air pressure between the chambers 21 and 22 through ports 31 and 32 the air pressure will tend to bring the valve back into the neutral position as soon as the difference in air pressure will reach value proportional to the downward force created by dash pot spring 172 and inertia of the weight 136.

It will be apparent, therefore, that the operating force of the arm 12 will resist against the upward movement of the body under action of the increased compression of the car springs caused by the elevation on the road. If instead of elevation, the vehicle will encounter a depression, the body will have a tendency to move downward and the forces will be reversed so that the arm 12 will have a tendency to oppose the downward movement of the body. Air vents 180 may be provided in the upper end of the tube 168.

A modified form of my stabilizer is shown in Fig. 7. A cylinder 181 has top and bottom covers 182 and 183 respectively and an outer cylindrical casing 184 spaced from the cylinder 181 so as to form an annular clearance 185. A cylindrical sleeve valve 186 is fitted in the clearance 185 and has inner circular ribs 187 and 187' closing ports 188 and 188' in the walls of the inner cylinder. The outer peripheral side of the sleeve 186 slidably bears against the inner surface of inner circular ribs 189 on the outer casing 184. The valve 186 has ports 190, 191 and 191' in communication with the intake pipe 52 for the compressed fluid and exhaust ports 130 and 130' respectively. The sleeve valve 186 has plungers 192 at the bottom and similar plungers 193 at the top sliding in corresponding bores 194 and 194' in communication with the respective ports 188 and 188' through ducts 195, and 195'. The upper plungers are of a larger diameter, having rods 196 extending through the top cover 182, the exposed areas of the plungers being substantially equal. The rods 196 are attached to the ends of a bar 197 connected at the middle point 198 to the lower end of the spring 172. The sleeve valve 186 is thereby balanced in the neutral position and is moved one way or the other by differential air pressure in the end portions of the cylinder. The acceleration responsive member in this case consists of the weight of the valve 186 itself and its inertia force is additive to velocity component of dash pot 168.

The ports 188 and 188' are spaced from the ends of the cylinder in order to provide for a cushioning effect by the air trapped by the piston 110 at the end of its travel in either direction. The object of this particular construction is to provide a very large area of ports for the cylinder in order to effect more rapid action of the valve in admitting compressed air into the cylinder.

My device with its inertia control of compressed air effectively inhibits movements and oscillations of the body in response to the corresponding movements of the wheels and axles. My device can be also adapted for preventing turning or upsetting effect on the body as may be caused by the centrifugal force when the vehicle is rounding a curve at a high speed. This arrangement is shown in Figs. 8 and 9 and consists in the provision of weight 200, the latter having arms 201 rigidly attached to the sides of the weight as by screws 201', the other ends of the arms being pivotally mounted on shaft 202 supported in brackets 202' on a double ring 203 clamping diaphragms 204 and 205 to a flange 206 of an oil well 207. The latter is separated by a partition 208 forming separate compartments 209 and 210 for the velocity responsive element 77 and for the inertia responsive element 83. The weights bear on the diaphragms 204 and 205. The arm 201 is positioned in direction at right angles to the longitudinal axis of the vehicle and in opposite directions for the right and left side of the vehicle so that the shaft 202 is placed on the inside and the weights on the outside with reference to the central longitudinal axis of the vehicle. The weights are, therefore, free to respond to vertical forces of inertia but, at the same time, weight 200 also responds to the centrifugal force which creates a turning moment for the weight around its pivoting points. It follows, therefore, that the centrifugal force creates a turning moment for the weights located at the outer side of the vehicle in rounding a curve thereby producing a reaction force by compressed air tending to keep this side of the vehicle up with a force which may be made sufficient to overcome the pressure on the springs caused by the turning moment of the centrifugal force on the body of the vehicle. There will be an opposite effect on the weights at the inner side of the vehicle, the turning moment being in this case such as to raise the weight from the diaphragms.

A similar arrangement is shown in Figs. 10, 11 and 15 illustrating a mechanism such as shown in Fig. 3 with the exception that the inertia lever 140 is placed at right angles to the velocity lever 133 and has a weight 211 extending vertically so as to be affected by horizontal forces of inertia in the same manner as the weight 200.

Another modification is shown in Fig. 12, this form of the stabilizer being adapted for either lateral, longitudinal or directional stabilization of an airplane. For this purpose this stabilizer is designed to respond only to rotary motions in a plane transverse to the direction of flight for lateral stabilization, or in the vertical plane of flight for longitudinal stabilization, or also in the horizontal plane of flight for directional stabilization.

This device has weights 212 and 212' which are equal in this case and spaced at the same distance from the pivotal support on an arm 133. The force transmitted to the dash pot 143 is proportional to the angular acceleration of the airplane if the device is placed on its axis of rotation. The device is not responsive, however, to straight linear motions. Therefore the distance (which is made purposely small) transversed by weight 212 is proportional to the angular velocity. The force of spring 132 is, therefore, also proportional to angular velocity.

Similarly weights 213 and 213' are of the same size and spaced on an arm 140 at the same distance from the pivotal support 141 so that the force transmitted to the valve 123 is proportional to the angular acceleration. The total net force on the valve is therefore, proportional to the angular velocity plus or minus angular acceleration of the airplane. This force is balanced at all times by the differential pressure acting on the piston 110 since the ends of the valve are exposed to this pressure through the ports 126 and 127 (Fig. 3). Consequently at any given moment the differential pressure will be proportional to the angular velocity plus or minus angular acceleration of the airplane, independently of the position of the piston 110 in the casing 106. The piston rod 111 is connected by an arm 214 with a cable 215 guided by rollers 216 and connected with ailerons (not shown), elevators (not shown) or other control devices which introduce reaction between the airplane and the surrounding air in direction required for stabilizing the airplane or straightening its position. Under the force of air pressure on piston 110 the ailerons will move such a distance as to reach a balance between the force on the piston and the force or torque of the air stream acting on the ailerons (elevators, rudder etc.). The stabilizing torque of the latter will be therefore, proportional to the dynamic characteristics of the angular motion of the airplane around its axis of rotation.

In another embodiment of my shock absorber as shown in Fig. 13 electromagnetic forces are utilized for producing stabilizing reaction on the body. A heavy magnet 217 is suspended on a long spring 218 attached to the body 6 so that it has a tendency to remain stationary in space due to its inertia, moving therefore in relation to a coil 219 which is also attached to the body 6.

Voltage generated in the coil 219 by the movement of the magnet is therefore proportional to the vertical velocity of the body. A weight 220 rests on a compression rheostat or piezo-crystal 221 and moves together with the body. The resistance of the rheostat or electromotive force of crystal varies, therefore as a vertical acceleration.

A vacuum tube amplifier 222 is connected with the coil and the rheostat and amplifies the currents, using a source of current 223 and designed to make its output proportional to the sum or difference of the vertical velocity and acceleration of the body. The amplifier 222 can be also of differentiating or integrating characteristic.

The output of the amplifier 223 is fed into a filed coil 227 of a constant speed D. C. generator 224 which, therefore, generates voltage proportional to the dynamic characteristics of the vertical movements of the body. The armature of the generator is connected to a coil 225 attached to the body. A magnet 226 attached to an axle 19 is moved in the coil 225 being either attracted or expelled depending on the direction of current through the coil, the force of such attraction or repulsion being proportional to the current through the coil, so that the stabilizing force of the magnet will be proportional to the vertical velocity and acceleration of the body.

In order to minimize the effect of counter electromotive force generated in the coil by the movements of the magnet, a feed-back connection is provided for the amplifier, the latter being designed to vary current in the solenoid accordingly so as to suppress the effect of the C. E. F. This feed-back connection can alternately be made to response to the extent of relative movement between coil 225 and magnet 226. In this way a purely magnetic suspension of the body to be stabilized can be achieved. If the output of amplifier 222 is fed directly into coil 225 such a rapid response to movements of body 6 can be obtained as to permit a stabilization of body against even high frequency oscillations due to sound transmission from 19. This kind of stabilizer or noise counteracting device is particularly applicable to street cars due to readily available source of electric energy.

I claim as my invention:

1. A shock absorber and stabilizer for a body adapted to have a motion of translation over a supporting medium, comprising a casing, a member movably supported in the casing and separating the casing into upper and lower chambers, a source of compressed fluid, means to selectively admit the fluid into one of the chambers simultaneously exhausting the fluid from the other chamber, thereby creating a differential pressure in the chambers, means to interpose resistance between the body and the supporting medium by said differential pressure, and means to control the differential pressure in proportion to the velocity and acceleration of the movements of the body transverse to the motion of translation.

2. A shock absorber and stabilizer for a body adapted to have a motion of translation over a supporting medium, comprising a casing, a member movably supported in the casing and separating the casing into upper and lower chambers, a source of compressed fluid, means to selectively admit the fluid into one of the chambers simultaneously exhausting the fluid from the other chamber, thereby creating a differential pressure in the chambers, means to interpose resistance between the body and the supporting medium by said differential pressure, a movable element responsive to dynamic characteristics of the movements transverse to the motion of translation, and means to control the differential pressure by the element so as to make this differential pressure continuously-proportional to a combination of said dynamic characteristics.

3. A shock absorber and stabilizer for a body resiliently supported on a member contacting a supporting medium, comprising a motor interposed between the body and the member, a source of power for the motor on the body, the body with the member being adapted to have a motion of translation on the supporting medium, a movable element adapted to control the power for the motor, and means responsive to the velocity and acceleration of the body in direction transverse to its motion of translation, for controlling the movable element, so as to cause the motor to resist the transverse movement of the body.

4. A shock absorber and stabilizer for a body resiliently supported on a member contacting a supporting medium, the body and the member being adapted to have a motion of translation over the supporting medium, the body being adapted to have oscillatory movements in relation to the supporting member in direction transverse to the motion of translation, a fluid motor interposed between the body and the member, a source of compressed fluid for the motor, a movable element responsive to dynamic properties of the transverse movements of the body, a valve adapted to admit the fluid into the motor, and means to move the valve by the movable element so as to oppose the transverse movements of the body by the motor by the compressed fluid.

5. A shock absorber and stabilizer for a body resiliently supported on a member contacting a supporting medium, the body and the member being adapted to have a motion of translation over the supporting medium, the body being adapted to have oscillatory movements in relation to the supporting member in direction transverse to the motion of translation, a fluid motor interposed between the body and the member, a source of compressed fluid for the motor, a valve controlling admittance of the fluid to the motor, a movable element responsive to dynamic properties of the transverse movements of the body, and means to move the valve by the movable element so as to oppose the transverse movements of the body by the motor, and means to return the valve into the neutral position by the operative fluid pressure in the motor.

6. A shock absorber and stabilizer for a body resiliently supported on a member contacting a supporting medium, the body and the member being adapted to have a motion of translation over the supporting medium, the body being adapted to have oscillatory movements in relation to the supporting member in direction transverse to the motion of translation, a fluid motor interposed between the body and the member, and consisting of a casing with a plunger movably fitted in the casing and separating the casing into the upper and lower chambers, a source of fluid for the motor, a valve adapted to control the admittance of the fluid into one of the chambers while exhausting the fluid from the other chamber, a movable element in the casing responsive to the velocity of the transverse motion of the body, a movable element in the casing responsive to the inertia of the body in its transverse movement, means to operate the valve by said movable elements so as to oppose the transverse movements of the body while assisting movements of the supporting member, and means to neutralize the action of the valve by the differential pressure in the chambers.

7. A shock absorber and stabilizer for a body resiliently supported on a member contacting a supporting medium, the body and the member being adapted to have a motion of translation over the supporting medium, the body being adapted to have oscillatory movements in relation to the supporting member in direction transverse to the motion of translation, a fluid motor interposed between the body and the member, and consisting of a casing with a plunger movably fitted in the casing and separating the casing into the upper and lower chambers, a source of compressed fluid for the motor, a vtlve adapted to control the admittance of the fluid into one of the chambers while exhausting the fluid from the other chamber, a movable element in the casing responsive to the velocity of the transverse motion of the body, a movable element in the casing responsive to the inertia of the body in its transverse movement, means to operate the valve by said movable elements so as to oppose the transverse movements of the body while assisting movements of the supporting member, means to neutralize the action of the valve by the differential pressure in the chambers, and means to vary the effect of the differential pressure on the valve in accordance with the relative position of the plunger in the casing.

8. A shock-absorber and stabilizer for a body resiliently supported on a member contacting a supporting medium, the body and the member being adapted to have a motion of translation over the supporting medium, the body being adapted to have oscillatory movements in relation to the supporting member in direction transverse to the motion of translation, a fluid motor interposed between the body and the member, and consisting of a casing with a plunger movably fitted in the casing and separating the casing into the upper and lower chambers, a source of compressed fluid for the motor, a valve adapted to control the admittance of the fluid into one of the chambers while exhausting the fluid from the other chamber, a movable element in the casing responsive to the velocity of the transverse motion of the body, a movable element in the casing responsive to the inertia of the body in its transverse movement, means to operate the valve by said movable elements so as to oppose the transverse movements of the body while assisting movements of the supporting member, and means to neutralize the action of the valve by the differential pressure in the chambers, means to vary the effect of the movable elements on the valve in accordance with the relative position of the plunger in the casing.

9. A shock absorber and stabilizer for a body resiliently supported on a member contacting a supporting medium, the body and the member being adapted to have a motion of translation over the supporting medium, the body being adapted to have oscillatory movements in relation to the supporting member in direction transverse to the motion of translation, a fluid motor interposed between the body and the member, and consisting of a casing with a plunger movably fitted in the casing and separating the casing into the upper and lower chambers, a source of compressed fluid for the motor, a valve adapted to control the admittance of the fluid into one of the chambers while exhausting the fluid from the other chamber, a movable element in the casing responsive to the velocity of the transverse motion of the body, a movable element in the casing responsive to the inertia of the body in its transverse movement, means to operate the valve by said movable elements so as to oppose the transverse movements of the body while assisting movements of the supporting member, and means to neutralize the action of the valve by the differential pressure in the chambers, an auxiliary fluid motor opposing movement of said elements, and means to control the auxiliary motor by the position of the plunger in the casing.

10. A shock absorber and stabilizer adapted to be supported between the body and the axle of a vehicle and comprising a casing and a member movably fitted in the casing separating the latter into the upper and lower chambers, a source of compressed fluid for the casing, a valve controlling the admittance of the fluid into the chambers of the casing, means to place the valve into the neutral position by the differential pressure in the chambers, said means being inoperative for the extreme positions of the members in the casing, elements on the casing responsive to the velocity and/or acceleration of the body in directions transverse to the axis of the vehicle, and means to operate the valve by said elements so as to produce differential pressure against the movable member opposing the transverse movements of the body while removing resistance to the corresponding movements of the axle.

11. A shock absorber and stabilizer adapted to be supported between the body and the axle of a vehicle and comprising a casing and a member movable fitted in the casing separating the latter into the upper and lower chambers, a source of compressed fluid for the casing, a valve controlling the admittance of the fluid into the chambers of the casing, and consisting of two relatively movable parts, yieldable means to keep the first valve part in the neutral position, yieldable means to keep the second valve part in the neutral position, elements responsive to the velocity and/or acceleration of the body in directions transverse to the progressive movement of the vehicle, means to move the first valve part by said elements for admitting compressed fluid into one chamber while exhausting the fluid from the other chamber so as to oppose said transverse movements of the body, and means to move the second valve part into the neutral position by the differential pressure in the chambers.

12. A valve for controlling differential pressure in two chambers, comprising a housing, two relatively movable valve members in the housing, yieldable means to keep the valve members in a neutral position, the first valve being adapted to be moved by a differential pressure in the chambers into the open position for admitting a compressed fluid into the chamber with low pressure and exhausting the chamber with high pressure thereby establishing balance of pressure in the chambers, the second valve being adapted to be moved by an external agency for admitting the compressed fluid into one of the chambers, until the first valve closes the second valve under action of said differential pressure.

13. A shock absorber and stabilizer comprising a motor adapted to be supported between the body and the end portion of the axle of a vehicle, a source of power for the motor, elements responsive to dynamic characteristics of the vertical movements of the body, means responsive to horizontal movements of the body in direction outward from said end portion of the axle, and means to control power input for the motor by said elements so as to create torque in the motor opposing said movements.

14. A shock absorber and stabilizer comprising a motor adapted to be supported between the body and the end portion of the axle of a vehicle, a source of power for the motor, a vertically movable element responsive to dynamic characteristics of the vertical movements of the body, a hinged vertically movable element responsive dynamic characteristics of horizontal movements of the body in direction outward from said end portion of the axle and means to control power input for the motor by said elements so as to create torque in the motor opposing said movements.

15. A shock absorber and stabilizer for a body comprising a motor element responsive to absolute velocities of the body in selected directions comprising a container with a viscous fluid, a flexible member closing the container, a weight supported on the flexible member, and adapted to exert pressure on the fluid, a cylinder in a restricted communication with the fluid, a member movably supported in the cylinder, retrieving means for balancing the normal fluid pressure on the member, the travel of the member being therefore substantially proportional to the velocity of the body in said selected directions, and means to control the motor by the movable member.

16. A shock absorber and stabilizer for a body comprising a motor, an element responsive to absolute acceleration of the body in selected directions comprising a container with a viscous fluid, a flexible member closing the container, a weight supported on the flexible member, and adapted to exert pressure on the fluid, a cylinder, a movable member in the cylinder directly exposed to the fluid pressure, resilient means to balance the fluid pressure, the travel of the member being therefore substantially proportional to the acceleration of the body in said selected directions, and means to control the motor by said member.

17. A shock absorber and stabilizer for a body resiliently supported on a member contacting a supporting medium, the body and the member being adapted to have a motion of translation over the supporting medium, the body being adapted to have oscillatory movements in relation to the supporting member in direction transverse to the motion of translation, a fluid motor interposed between the body and the member, and consisting of a casing with a plunger movably fitted in the casing and separating the casing into the upper and lower chambers, a source of compressed fluid for the motor, a valve adapted to control the admittance of the fluid into one of the chambers while exhausting the fluid from the other chamber, a movable element in the casing responsive to the velocity of the transverse motion of the body, a movable element in the casing responsive to the inertia of the body in its transverse movement, means to operate the valve by said movable elements so as to oppose the transverse movements of the body while assisting movements of the supporting member, and means to neutralize the action of the valve by the differential pressure in the chambers, an auxiliary fluid motor opposing movement of said elements, and means to control the auxiliary motor by the position of the plunger in the casing, said means consisting of a valve adapted to control admission of the compressed fluid to the auxiliary motor, a spring pressing on the valve, means to vary the spring tension by the position of the plunger in the casing, the valve being adapted to be balanced by the fluid pressure in the auxiliary motor acting on the valve in direction opposite to the spring pressure.

18. A fluid pressure relay comprising a casing and a member movable fitted in casing separating the latter into upper and lower chambers, source of compressed fluid for the casing, a valve controlling the admission of the fluid into chambers of the casing, movable means to place the valve into neutral position, yieldable means to actuate the valve, movable means responsive to pressure conditions in the chambers, a dampening device restraining the movement of movable means, and controlling means for the valve responsive to conditions of movement of the body.

19. A fluid pressure relay comprising a casing and a member movable fitted in casing separating the latter into upper and lower chambers, a source of compressed fluid for the casing, a valve controlling the admission of the fluid into chambers of the casing, movable means to place the valve into neutral position, a cam actuated by the movement of the member, an operative connection between the cam and movable means, and controlling means for the valve responsive to the movements of the body.

20. A yieldable fluid pressure support for a body over a member contacting a supporting medium, the body and the member being adapted to have a motion of translation over the supporting medium, comprising a fluid motor interposed between the body and the member, a source of compressed fluid for the motor, a valve controlling the distribution of the fluid to the motor, a movable element responsive to the change of distance between the body and the member, and means to move the valve by the movable element so as to oppose the transverse movements of the body by the motor, and means to return the valve into the neutral position by the differential fluid pressure in the motor.

21. A shock absorber and stabilizer for a body resiliently supported on a member contacting a supporting medium, comprising a motor interposed between the body and the member, a source of power for the motor on the body, the body with the member being adapted to have a motion of translation on the supporting medium, a movable element adapted to control the power for the motor, elements responsive to the velocity and acceleration of the body in relation to the supporting member, and means to control the movable element by said elements so as to cause the motor to resist the movements of the body in relation to the supporting member.

22. A shock absorber for a body resiliently supported on a member contacting a supporting medium, the body and the member being adapted to have a motion of translation over the supporting medium, a fluid motor interposed between the body and the member, a source of fluid for the motor, a two-part compound movable valve for controlling communication between the motor and the source of fluid, means to move one part of the compound valve a relatively large distance proportional to the differential pressure between the compression and suction sides of the motor for relieving pressure of the fluid in the compression side, suction operated means for admitting fluid into the suction side, a movable inertia element responsive to dynamic properties of the transverse movement of the body, and means to move the second part of the compound valve by the inertia element a relatively large distance proportional to a combination of dynamic properties of the transverse movement of the body for stabilizing the transverse movement of the body by the fluid pressure built up in and by the motor.

23. A shock absorber for a body resiliently supported on a member contacting a supporting medium, the body and the member being adapted to have a motion of translation over the supporting medium, a fluid motor interposed between the body and the member, a source of fluid for the motor, a valve for controlling communication between the motor and the source of fluid, a movable inertia element responsive to dynamic properties of the transverse movements of the body, means to move the valve by the inertia element a relatively large distance for opposing by the fluid pressure in the motor the transverse movements of the body, and means to move the valve toward its neutral position a relatively large distance proportional to the differential pressure of the fluid in the compression and suction sides of the motor.

SERGEI D. MITEREFF.